(12) United States Patent
Lu

(10) Patent No.: US 9,195,451 B2
(45) Date of Patent: Nov. 24, 2015

(54) SERVER SYSTEM AND UPDATE METHOD THEREOF

(71) Applicants: Inventec (Pudong) Technology Corporation, Shanghai (CN); INVENTEC CORPORATION, Taipei (TW)

(72) Inventor: Ying-Chih Lu, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 3 days.

(21) Appl. No.: 14/243,608

(22) Filed: Apr. 2, 2014

(65) Prior Publication Data

US 2015/0149989 A1 May 28, 2015

(30) Foreign Application Priority Data

Nov. 26, 2013 (CN) .......................... 2013 1 0610617

(51) Int. Cl.
*G06F 9/44* (2006.01)
*G06F 9/445* (2006.01)

(52) U.S. Cl.
CPC .. *G06F 8/65* (2013.01); *G06F 8/61* (2013.01); *G06F 8/665* (2013.01); *G06F 8/68* (2013.01); *G06F 8/71* (2013.01)

(58) Field of Classification Search
None
See application file for complete search history.

(56) References Cited

U.S. PATENT DOCUMENTS

| | | | |
|---|---|---|---|
| 7,363,480 B1 * | 4/2008 | Righi ........................ | G06F 8/65 709/219 |
| 7,376,870 B2 * | 5/2008 | Kataria ..................... | G06F 8/65 714/3 |

(Continued)

*Primary Examiner* — Don Wong
*Assistant Examiner* — Hossain Morshed
(74) *Attorney, Agent, or Firm* — Locke Lord LLP; Tim Tingkang Xia, Esq.

(57) ABSTRACT

A server system and an updating method of firmware are provided, and the updating method includes: acquiring a configuration file which includes firmware packet data which corresponds to a node in the server system; sending a notification signal to a web server of the node described in the configuration file; acquiring a version annotation and update package data in the configuration file according to the notification signal; storing the version annotation and the update package data to obtain file paths of the version annotation and the update package data; and selectively installing the update package data to the node according to internet protocol addresses of the file paths and the node.

10 Claims, 4 Drawing Sheets

(56) References Cited

U.S. PATENT DOCUMENTS

| | | | | |
|---|---|---|---|---|
| 7,483,370 B1* | 1/2009 | Dayal | ................ | G06F 11/2038 370/219 |
| 2002/0144250 A1* | 10/2002 | Yen | ................ | G06F 8/65 717/168 |
| 2004/0103340 A1* | 5/2004 | Sundareson | ........ | G06F 11/1433 714/6.3 |
| 2005/0010693 A1* | 1/2005 | Sinclair | ................ | H04L 12/2856 709/250 |
| 2005/0034115 A1* | 2/2005 | Carter | ................ | G06F 8/64 717/173 |
| 2006/0069836 A1* | 3/2006 | Seo | ................ | G06F 8/65 710/302 |
| 2009/0077634 A1* | 3/2009 | Hung | ................ | G06F 8/65 726/4 |
| 2010/0185859 A1* | 7/2010 | Unagami | ................ | G06F 21/57 713/168 |
| 2011/0047538 A1* | 2/2011 | Chung | ................ | H04L 41/082 717/173 |
| 2011/0173599 A1* | 7/2011 | Ohama | ................ | G06F 8/65 717/168 |
| 2011/0225653 A1* | 9/2011 | Maeda | ................ | G06F 21/55 726/22 |
| 2012/0079473 A1* | 3/2012 | Watanabe | ................ | G06F 8/65 717/170 |
| 2012/0150987 A1* | 6/2012 | Nagamine | ................ | G06F 8/65 709/213 |
| 2013/0125107 A1* | 5/2013 | Bandakka | ................ | G06F 8/665 717/171 |
| 2013/0326494 A1* | 12/2013 | Nunez | ................ | H04L 41/082 717/172 |
| 2013/0339940 A1* | 12/2013 | Goel | ................ | H04L 41/082 717/172 |
| 2014/0053146 A1* | 2/2014 | Freiter | ................ | G06F 8/65 717/170 |
| 2014/0089912 A1* | 3/2014 | Wang | ................ | G06F 8/65 717/173 |
| 2014/0379817 A1* | 12/2014 | Logue | ................ | H04L 49/355 709/206 |
| 2015/0149989 A1* | 5/2015 | Lu | ................ | G06F 8/65 717/170 |

* cited by examiner

SERVER SYSTEM AND UPDATE METHOD THEREOF

CROSS-REFERENCE TO RELATED APPLICATIONS

This non-provisional application claims priority under 35 U.S.C. §119(a) on Patent Application No(s). 201310610617.0 filed in China on Nov. 26, 2013, the entire contents of which are hereby incorporated by reference.

BACKGROUND OF THE INVENTION

1. Technical Field of the Invention

The disclosure relates to a server system and an updating method of firmware, and more particularly to a server system and an updating method of firmware capable of automatically updating firmware of servers.

2. Description of the Related Art

Because Internet allows computers to connect to each other, a computer can exchange or assess data with another through a network. For example, client ends can communicate with servers in a server system through a network.

Generally, a server system has many nodes each of which can simultaneously operate multiple virtual machines, so as to provide users with various independent work environments. Each node can be determined as an independent computer, which has memories, storage, an operating capability and a networking function, and thus operate its own OS. These nodes can communicate with and transmit data to each other through network equipment. After the server system is disposed with these nodes, these nodes have to be set and arranged. That is, each node has to be installed with its OS, software package data and firmware packet data. Thereby, the server system can operate and provide users with services.

However, if a manufacturer provides a new version of a configuration file which has firmware packet data corresponding to one hardware in one node in the server system, the server system will not automatically update the version of the firmware packet data of the node because can not automatically notify the nodes in the server system that this new version of the firmware packet data has been provided.

SUMMARY OF THE INVENTION

According to an embodiment of the disclosure, an updating method of firmware adapted to a server system, e.g. a container data center, includes steps of: acquiring a configuration file comprising firmware packet data corresponding to a node in the server system; sending a notification signal to a web server of the node described in the configuration file; acquiring a version annotation (or called release note) and an update package data in the configuration file according to the notification signal; storing the version annotation and the update package data, so as to obtain a file path of the version annotation and of the update package data; and selectively installing the update package data in the node according to internet protocol address of the file path and the node.

In an embodiment of the updating method, after the version annotation and the update package data are stored, the aforementioned updating method further comprises: acquiring identification information in the version annotation according to the internet protocol address of the file path and the node, and the identification information at least comprising one of a firmware version and a product name.

In an embodiment of the updating method, before the node is installed with the update package data according to the internet protocol address of the file path and the node, the aforementioned updating method further comprises: determining whether the configuration file is a newer version according to actual identification information of the identification information and the node; and installing the update package data into the node when the configuration file is the newer version.

In an embodiment of the updating method, after the configuration file is determined as the newer version, the aforementioned updating method further comprises: calculating and obtaining an update priority value corresponding to one piece of firmware of the node according to parameters of the node which comprise a severity of the update package data of the firmware of the node, a quantity of firmware required to be updated in the node, time and a network bandwidth for updating firmware, and a pool load of the node; recording the node into an update hash table; determining whether update priority values of all of nodes recorded in the update hash table are larger than an update threshold; sequentially recording and sorting the nodes, whose the update priority values larger than the update threshold, into an update queue table; and installing the update package data into the nodes according to an order of the nodes in the update queue table.

In an embodiment of the updating method, before whether the update priority values of all of the nodes in the update hash table are larger than the update threshold is determined, the aforementioned updating method further comprises: periodically adding a preset value to the update priority values of all of the nodes in the update hash table.

According to an embodiment of the disclosure, a server system includes: at least one node; a load module for acquiring a configuration file which comprises firmware packet data which corresponds to one of the at least one node, and sending a notification signal when acquiring the configuration file; a first resident module for communicating with the load module, and acquiring update package data and a version annotation from the configuration file according to the notification signal; a first database for communicating with the first resident module and storing the version annotation and the update package data to obtain a file path of the version annotation and the update package data in the first database; and a second resident module for communicating with the first resident module, the first database and the at least one node, and selectively installing the update package data into the node according to an internet protocol address of the file path and of one of the at least one node.

In an embodiment of the server system, the aforementioned server system further includes a second database for communicating with the second resident module, and storing identification information in the version annotation. The identification information is obtained according to the internet protocol address of the file path and of the node and at least comprises one of a firmware version and a product name.

In an embodiment of the server system, the aforementioned second resident module further determines whether the configuration file is a newer version according to actual identification information of the identification information and the node in the second database, and when the configuration file is the newer version, installs the update package data into the node.

In an embodiment of the server system, when the configuration file is the newer version, the aforementioned second resident module, according to parameters of the node, further calculates and obtains an update priority value corresponds to one piece of firmware of the node, records the node into an update hash table, determines whether the update priority values of all of the nodes recorded in the update hash table are larger than an update threshold, sequentially records and sorts the nodes, whose update priority values larger than the update threshold, in an update queue table, and installs the update package data in the nodes according to an order of the nodes recorded in the update queue table. The parameters include a severity of the update package data of all pieces of the firmware of the node, a quantity of the firmware of the node required to be updated, time and a network bandwidth of updating the firmware, and a pool load of the node.

In an embodiment of the server system, before determining whether the update priority values of all of the nodes recorded in the update hash table are larger than the update threshold, the aforementioned second resident module further periodically adds a preset value to the update priority values of all of the nodes recorded the update hash table.

BRIEF DESCRIPTION OF THE DRAWINGS

The present disclosure will become more fully understood from the detailed description given herein below for illustration only and thus does not limit the present disclosure, wherein.

DETAILED DESCRIPTION

Figure 1:
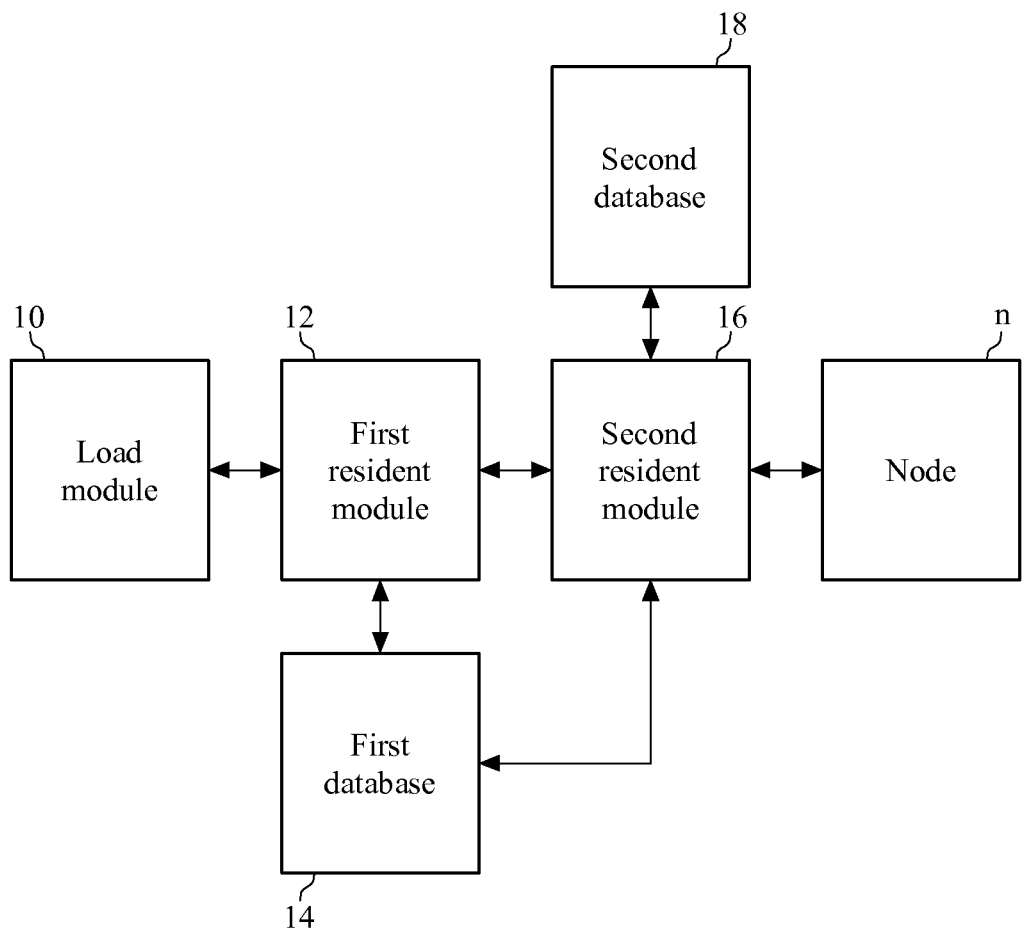
FIG. 1 is a block diagram of a server system according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

[An Embodiment of a Server System]

FIG. 1 is a block diagram of a server system 1 according to an embodiment of the disclosure. The server system 1 mainly includes a load module 10, a first resident module 12, a first database 14, a second resident module 16, a second database 18 and a node n. The second resident module 16 wiredly or wirelessly communicates with the first resident module 12, the first database 14, the second database 18 and the node n, and the first resident module 12 wiredly or wirelessly communicates with the load module 10 and the first database 14. In particular embodiments, the node n can be determined as a container data center or one single board computer in a container data center. In this and some embodiments, a quantity of nodes can be one or more. The elements in the server system 1 are described below.

The load module 10 acquires a configuration file, i.e. an allocate file, and when acquiring the configuration file, sends a notification signal to a web server in the first resident module 12. The configuration file includes firmware packet data corresponding to the node n. In particular embodiment, the load module 10 can be a command line interface (CLI) tool, i.e. a command line tool, and the extension, i.e. a filename extension and a name suffix, can be ".json" or ".yaml." The load module 10 can also send an update notification to a mailbox of an email address through a simple mail transfer protocol (SMTP) server according to the configuration file, and the SMTP server and the email address are associated with the node n whose firmware is required to be updated.

Generally, the configuration file includes firmware type information, firmware version information, a product name, an internet protocol (IP) address of the SMTP server, email addresses, uniform resource locators (URLs) of version annotations (release notes), URLs of update package data (release package data), a copy protocol, an URL of an web server, and an authentication. For example, the product name can be a universally unique identifier (UUID) or a combination of a manufacturers name and a product name. For example, the type of firmware can be a basic input output system (BIOS) type, a baseboard management controller (BMC) type, a redundant array of independent disks (RAID) type, a hypertext transfer protocol (HTTP) type, a file transfer protocol (FTP) type or a secure shell (SSH) protocol type. For example, the filename extension of the version annotation can be ".json," and the filename extension of the update package data can be ".zip."

Moreover, the notification signal includes a copy protocol, an identifier, a URL of version annotation and a URL of update package data. The identifier and the copy protocol can be used for acquiring the version annotation according to the URL of version annotation and acquiring the update package data according to the URL of update package data.

The first resident module 12 acquires version annotation and update package data from the configuration file according to the notification signal. Specifically, the first resident module 12 acquires the version annotation and the update package data in the configuration file according to the copy protocol, identifier, URL of version annotation and URL of update package data in the notification signal. In a particular embodiment, the first resident module 12 includes an operations (OPS) web server with a RESTful Web service and the demons for acquiring the notification signal, and the demons can provide API through a TCP/socket method or an UDP/socket method. Generally, the update package data includes a firmware image, a firmware update program and an update script file for the firmware updating.

The first database 14 stores the version annotation and the update package data acquired by the first resident module 12, and obtains a file path of the version annotation and of the update package data in the first database 14. The second database 18 stores the identification information of the version annotation, and the identification information is obtained according to the file path and the IP address of the node n. In a particular embodiment, the identification information at least includes one of the firmware version and the product name in the configuration file. In a particular embodiment, the product name of each of physical machines in the node n can be represented by a 16-bytes universally unique identifier (UUID) or by a combination of its product name and manufacturer name, so that these product names of physical machines can be unique.

Moreover, the identification information further includes the update attribute of the node n, and the update attribute is used for specifying the node n to be update its firmware by using a live CD (i.e. a live disk) or an operating system (OS), and specifying whether the node n should be rebooted after the firmware of the node n is updated. For example, the node n has to be rebooted after the firmware of the BIOS or RAID of the node n is updated, but does not need to be rebooted after the firmware of the BMC is updated. Furthermore, the update attribute can specify the severity of the update package data.

The live CD is a complete bootable computer installation including an OS which runs in a computer's memory, rather than loading from a hard disk drive. More particularly, whenever the node n boots by using the live CD, an ISO stored in the live CD will be decompressed and stored in a random access memory (RAM) in the node n, so as to establish an executable environment in the RAM. After being rebooted, the node n then returns to its original OS.

The second resident module 16 selectively installs the update package data in the node n according to the internet protocol addresses of the file path and the node n. Specifically, the second resident module 16 determines whether the configuration file is a newer version according to the actual identification information of the identification information and the node n in the second database 18. When the configuration file is a newer version, the second resident module 16 installs the update package data in the node n at suitable timing, and the suitable timing can be defined according to particular requirements. In a particular embodiment, in order to protect the original setting of the firmware to be changed, when the node n performs the update script file in the update package data to update its firmware, the configuration data area of a flash ROM storing the original setting data of the firmware will not be updated or formatted. In other words, the original setting data of the firmware of the node n will be maintained in the configuration data area of the flash ROM.

In an embodiment, the second resident module 16 further determines whether the node n in the server system 1 is sensed at first time. When the node n is sensed at first time, the second resident module 16 will store information, e.g. the firmware versions of the physical machines and the product name in the node n, about the node n into the second database 18.

Therefore, when determining that the configuration file is a newer version, second resident module 16 can further acquire multiple parameters of the node n according to the identification information stored in the second database 18, and then calculate and obtain an update priority value according to the parameters. The update priority value corresponds to the firmware of one physical machine in the node n. The parameters include, for example, a severity of the update package data of all pieces of the firmware of the node n, a quantity of the firmware required to be updated in the node n, the time and network bandwidth for updating the firmware, and a pool load of the node n.

In an embodiment, the higher the severity of the update package data is, the larger the update priority value is. For example, while the severity is the highest, the update priority value is 90; while the severity is middle, the update priority value is 60; and while the severity is minimum, the update priority value is 0. In an embodiment, the larger the quantity of the firmware required to be updated is, the larger the update priority value is. For example, whenever the firmware of one physical machine is updated, the update priority value will be added with 10. In an embodiment, the longer the time for updating the firmware is, the less the update priority value is. For example, while the time for updating the firmware is very long, the update priority value is 0. In an embodiment, the wider the bandwidth for updating the firmware is, the less the update priority value is. For example, while the bandwidth for updating the firmware arrives at its maximum, the update priority value is 0. In an embodiment, the larger the pool load of the node n is, the less the update priority value is. For example, while the pool load of the node n arrives at its maximum, the update priority value is 0. Assume that there are only two pieces of firmware required to be updated in the node n, the severity of the configuration file corresponding to the two pieces of firmware is maximum, and the time, network bandwidth and pool load for updating the firmware arrive at their maximum. The update priority value herein is the sum of 20 and 90.

Then, the second resident module 16 records the node n into an update hash table, determines whether the update priority values of all of nodes recorded in the update hash table are larger than an update threshold, and sorts and records the nodes, whose update priority value larger than the update threshold, into an update queue table. For example, if the update priority value of the node n is the sum of 20 and 90 and the update threshold is 90, this node n will be recorded into the update queue table. Thereby, the second resident module 16 can install the update package data into the nodes according an order of the nodes recorded in the update queue table. In an embodiment, the nodes are installed with the update package data one by one or a batch by a batch.

On the other hand, before determining whether the update priority values of all of the nodes recorded in the update hash table are larger than the update threshold, the second resident module 16 can periodically adds a preset value to the update priority values of all of the nodes recorded in the update hash table. For example, the second resident module 16 adds 1 to the update priority values of all of the nodes recorded in the update hash table once every 30 minutes. Therefore, the nodes recorded in the update hash table can be protected from missing the installing of the update package data because the update priority value is too small.

In an embodiment, when attempting to install the update package data into one physical machine in the node n, the second resident module 16 can determine whether to perform the updating procedure on this physical machine by using the live CD, according to the update attribute of the identification information.

In one hand, if the second resident module 16 determines that this physical machine has to be updated by using the live CD, the second resident module 16 will remove a virtual machine corresponding to this physical machine, command the cloud not to use this physical machine, set this physical machine to be a preboot execution environment (PXE) for the live CD, and reboot this physical machine. Thus, the update package data can be installed or copied to this physical machine. Then, this physical machine decompresses the update package data to obtain an update script file, and performs the update script file to update the firmware of this physical machine. After the firmware of this physical machine is updated, the second resident module 16 sets this physical machine to be a PXE for a local HDD, and notifies the cloud that this physical machine is available after rebooting this physical machine.

In the other hand, if the second resident module 16 determines that this physical machine has to be updated by using the OS, the second resident module 16 will directly install or copy the update package data to this physical machine. Then, this physical machine decompresses the update package data in the OS to obtain an update script file, and performs the update script file to update the firmware of this physical machine. After the firmware of this physical machine is updated, the node n determines whether to reboot this physical machine according to the type of this physical machine. For example, if this physical machine is a RAID, the RAID has to be rebooted; and if this physical machine is a BMC, the BMC does not need to be rebooted.

[An Embodiment of an Updating Method of Firmware]

Figure 2:
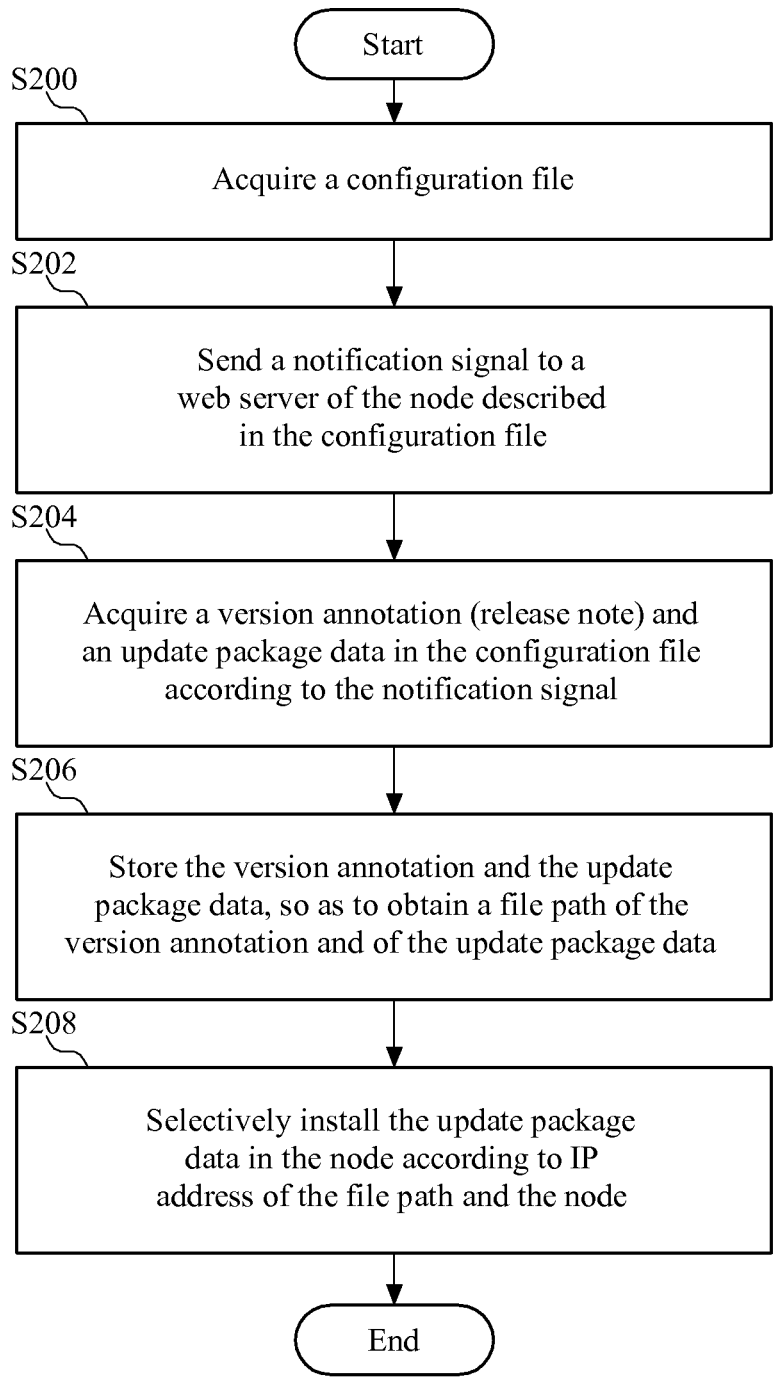
FIG. 2 is a flowchart of an updating method of firmware according to an embodiment of the disclosure.

FIG. 2 is a flowchart of an updating method of firmware according to an embodiment of the disclosure. The updating method is adapted to the server system 1 in FIG. 1. The steps of the updating method are described below.

As shown in step S200, the load module 10 acquires the configuration file which includes the firmware packet data corresponding to the node n. As shown in step S202, the load module 10 sends a notification signal to a web server of the node n described in the configuration file. As shown in step S204, the first resident module 12 acquires the version annotation and the update package data from the configuration file according to the notification signal. As shown in step S206, the first database 14 stores the version annotation and the update package data acquired by the first resident module 12, to obtain a file path of the version annotation and of the update package data in the first database 14. As shown in step S208, the second resident module 16 selectively installs the update package data to the node n according to the file paths in the first database 14 and the IP address of the node n.

[Another Embodiment of an Updating Method of Firmware]

Figure 3:
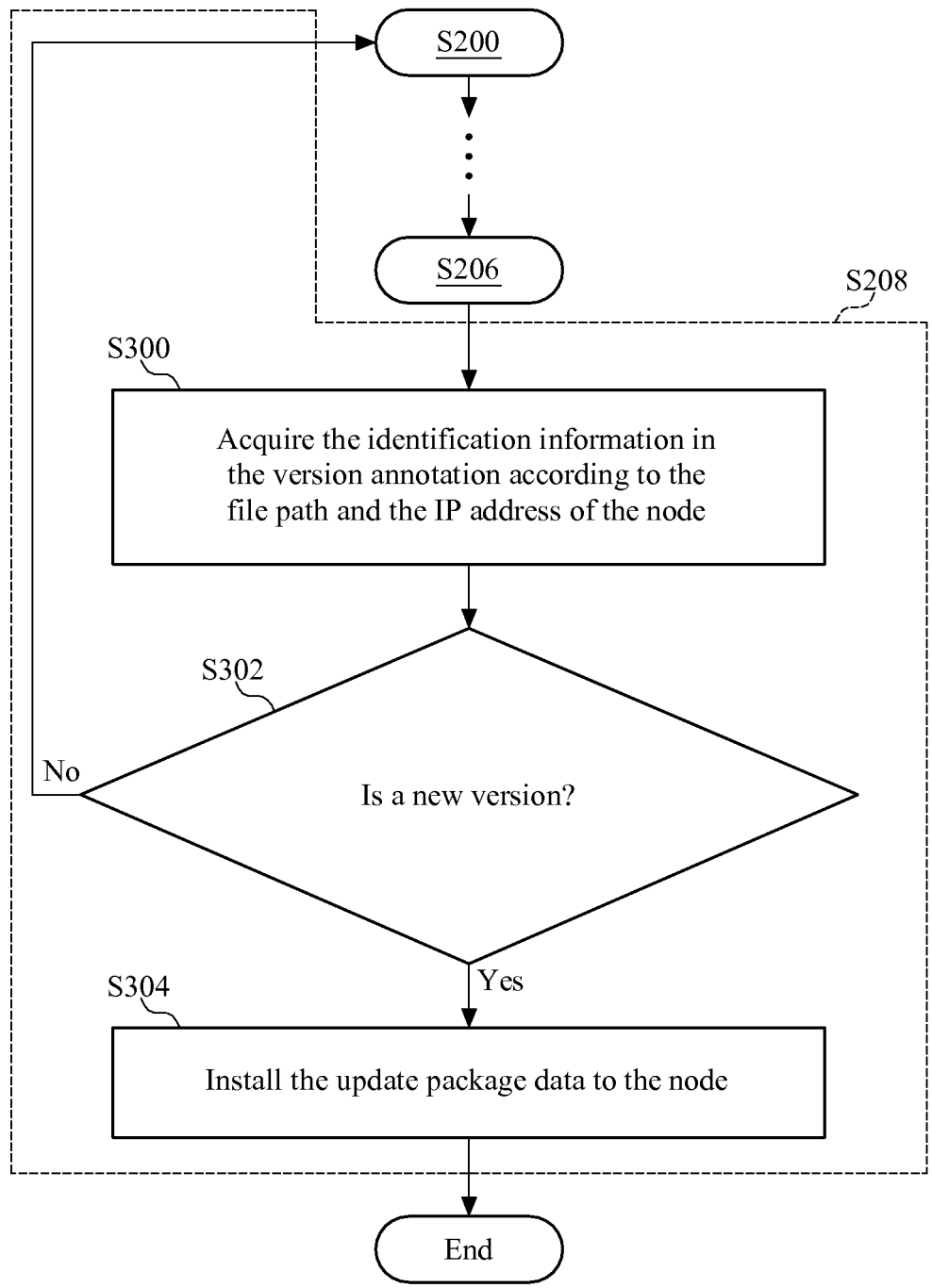
FIG. 3 is a flowchart of an updating method of firmware according to another embodiment of the disclosure.

FIG. 3 is a flowchart of an updating method of firmware according to another embodiment of the disclosure. The updating method is adapted to the server system 1 in FIG. 1. Steps S200 to S206 in FIG. 3 are equal to those in FIG. 2 and will not be described again hereinafter.

As shown in step S300, the second resident module 16 acquires the identification information in the version annotation according to the file path and the IP address of the node n obtained in step S206 after the first database 14 stores the version annotation and the update package data (S206). This identification information at least includes one of a firmware version and a product name. As shown in step S302, the second resident module 16 determines whether the configuration file is a newer version (i.e. the firmware version of the node n is newer than the firmware version in the configuration file) according to the actual identification information of the identification information and the node n. If the configuration file is not a newer version, the updating method returns to step S200. If the configuration file is a newer version, the second resident module 16 installs the update package data to the node n, as shown in step S304.

Figure 4:
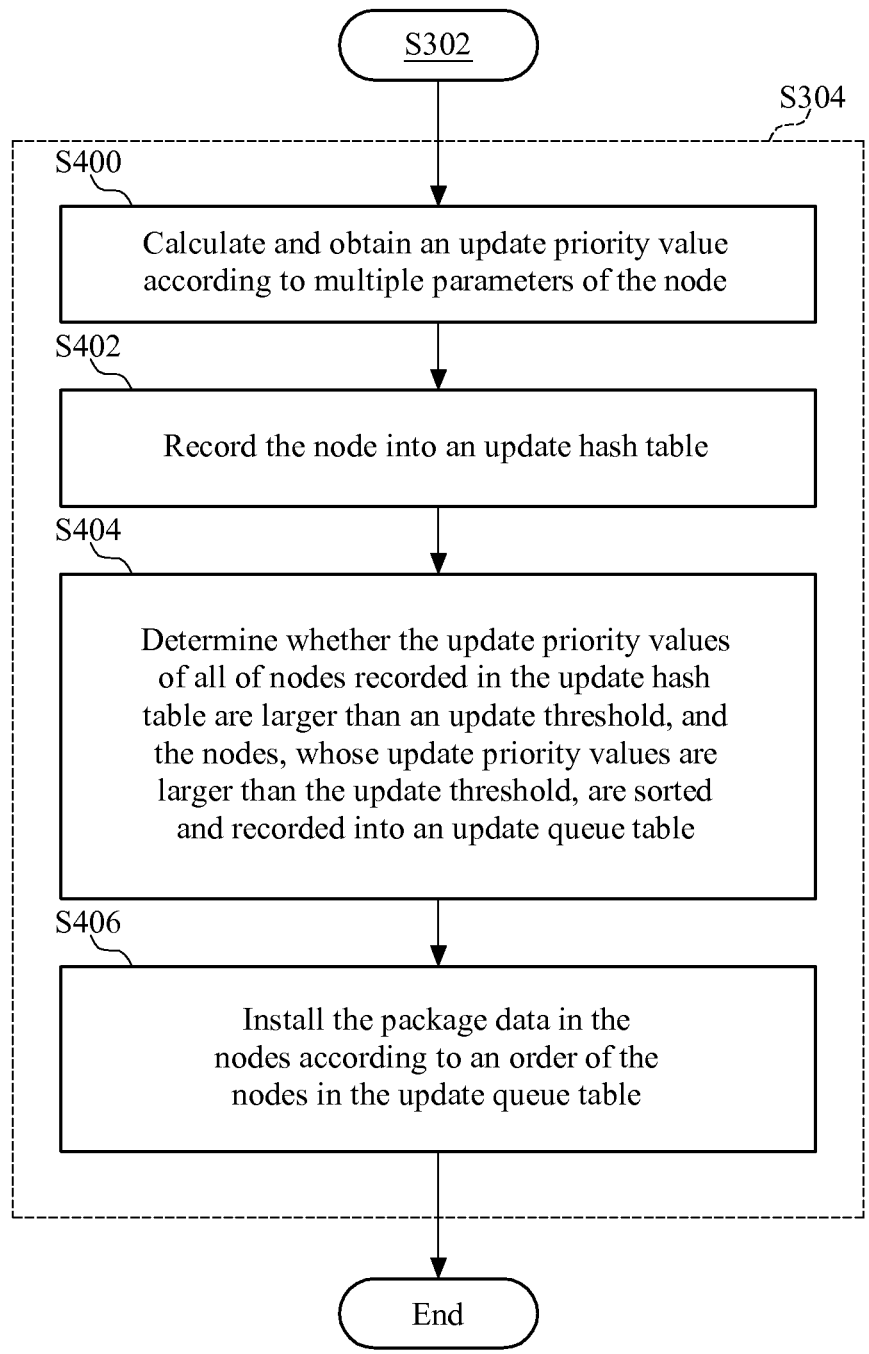
FIG. 4 is a flowchart of the details of the updating method in FIG. 3.

FIG. 4 is a flowchart of the details of the updating method in FIG. 3. As shown in step S400, the second resident module 16 calculates and obtains an update priority value according to multiple parameters of the node n after the second resident module 16 determines that the configuration file is a newer version (S302). This update priority value corresponds to one piece of firmware in the node n, and the parameters include, for example, a severity of the update package data of all pieces of firmware in the node n, a quantity of firmware required to be updated in the node n, time and network bandwidth for updating the firmware, and a pool load of the node n.

As shown in step S402, the second resident module 16 records the node n into an update hash table. As shown in step S404, the second resident module 16 determines whether the update priority values of all of nodes recorded in the update hash table are larger than an update threshold, and the nodes, whose update priority values are larger than the update threshold, are sorted and recorded into an update queue table. As shown in step S406, the second resident module 16 installs the package data in the nodes according to an order of the nodes recorded in the update queue table.

In view of the above description, the disclosure providing a server system and an updating method of firmware, can automatically notify the servers (nodes) in the server system when a certain version of a configuration file of one node is released, and can determine whether the version of the configuration file is newer than a current version of the node according to the version annotation and the update package data in the configuration file, so as to selectively install the update package data to the node. Moreover, the disclosure can also sort an order of the nodes in the update queue table to be updated according to the update priority values of the nodes, and the update priority value can dynamically be adjusted. Therefore, the disclosure can be applicative to a cloud OS based on OpenStack and crowbar, so as to increase its practicality.

What is claimed is:

1. An updating method of firmware, adapted to a server system and comprising:
    acquiring a configuration file comprising firmware packet data corresponding to a node in the server system;
    sending a notification signal to a web server of the node described in the configuration file;
    acquiring a version annotation and an update package data in the configuration file according to the notification signal;
    storing the version annotation and the update package data, so as to obtain a file path of the version annotation and of the update package data;
    determining whether update priority values of all of the nodes recorded in a update hash table are larger than an update threshold;
    sequentially recording and sorting the nodes, whose the update priority values larger than the update threshold, into an update queue table; and
    selectively installing the update package data in the node according to the update queue table, internet protocol address of the file path and the node.

2. The updating method according to claim 1, wherein after the version annotation and the update package data are stored, and the updating method further comprises: acquiring identification information in the version annotation according to the internet protocol address of the file path and the node, and the identification information at least comprising one of a firmware version and a product name.

3. The updating method according to claim 2, further comprising the following steps before the node is installed with the update package data according to the internet protocol address of the file path and the node: determining whether the configuration file is a newer version according to actual identification information of the identification information and the node; and installing the update package data into the node when the configuration file is the newer version.

4. The updating method according to claim 3, further comprising the following steps after the configuration file is determined as the newer version:
    calculating and obtaining an update priority value corresponding to one piece of firmware of the node according to parameters of the node which comprise a severity of the update package data of the firmware of the node, a quantity of firmware required to be updated in the node, time and a network bandwidth for updating firmware, and a pool load of the node;
    recording the node into the update hash table; and
    installing the update package data into the nodes according to an order of the nodes in the update queue table.

5. The updating method according to claim 4, further comprising the following step before whether the update priority values of all of the nodes in the update hash table are larger than the update threshold is determined: periodically adding a preset value to the update priority values of all of the nodes in the update hash table.

6. A server system, comprising:
    at least one node;
    a load module for acquiring a configuration file which comprises firmware packet data which corresponds to one of the at least one node, and sending a notification signal when acquiring the configuration file;

a first resident module for communicating with the load module, and acquiring update package data and a version annotation from the configuration file according to the notification signal;

a first database for communicating with the first resident module and storing the version annotation and the update package data to obtain a file path of the version annotation and the update package data in the first database; and a second resident module for communicating with the first resident module, the first database and the at least one node, determining whether update priority values of all of the nodes recorded in a update hash table are larger than an update threshold, sequentially recording and sorting the nodes, whose the update priority values larger than the update threshold, in an update queue table, and selectively installing the update package data into the node according to the update queue table, an internet protocol address of the file path and of one of the at least one node.

7. The server system according to claim 6, further comprising a second database for communicating with the second resident module, and storing identification information in the version annotation, wherein the identification information is obtained according to the internet protocol address of the file path and of the node and at least comprises one of a firmware version and a product name.

8. The server system according to claim 7, wherein the second resident module further determines whether the configuration file is a newer version according to actual identification information of the identification information and the node in the second database, and when the configuration file is the newer version, installs the update package data into the node.

9. The server system according to claim 8, wherein when the configuration file is the newer version, the second resident module, according to parameters of the node, further calculates and obtains an update priority value corresponds to one piece of firmware of the node, records the node into the update hash table, and installs the update package data in the nodes according to an order of the nodes recorded in the update queue table, the parameters comprise a severity of the update package data of all pieces of the firmware of the node, a quantity of the firmware of the node required to be updated, time and a network bandwidth of updating the firmware, and a pool load of the node.

10. The server system according to claim 9, wherein before determining whether the update priority values of all of the nodes recorded in the update hash table are larger than the update threshold, the second resident module further periodically adds a preset value to the update priority values of all of the nodes recorded the update hash table.

* * * * *